United States Patent
Gaertner

(10) Patent No.: US 10,946,851 B2
(45) Date of Patent: Mar. 16, 2021

(54) PUMP ARRANGEMENT FOR A HYDRAULIC UNIT HAVING A PUMP PISTON

(71) Applicant: Robert Bosch GmbH, Stuttgart (DE)

(72) Inventor: Oliver Gaertner, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/634,775

(22) PCT Filed: Jul. 30, 2018

(86) PCT No.: PCT/EP2018/070553
§ 371 (c)(1),
(2) Date: Jan. 28, 2020

(87) PCT Pub. No.: WO2019/052735
PCT Pub. Date: Mar. 21, 2019

(65) Prior Publication Data
US 2020/0180584 A1    Jun. 11, 2020

(30) Foreign Application Priority Data
Sep. 12, 2017 (DE) .................. 10 2017 216 002.0

(51) Int. Cl.
*F04B 19/04*   (2006.01)
*B60T 17/02*   (2006.01)
(Continued)

(52) U.S. Cl.
CPC .............. *B60T 17/02* (2013.01); *B60T 13/16* (2013.01); *F04B 19/04* (2013.01); *F04B 53/14* (2013.01); *F04B 53/16* (2013.01)

(58) Field of Classification Search
CPC .......... F04B 19/04; F04B 53/14; F04B 53/16; F04B 1/0439; F04B 53/143; F04B 1/0408; B60T 17/02; B60T 8/4031
See application file for complete search history.

(56) References Cited

U.S. PATENT DOCUMENTS 6,093,003 A * 7/2000 Hauser .................. B60T 8/4031
                                                    417/523
6,276,909 B1 * 8/2001 Siegel ................... B60T 8/4031
                                                    417/470
(Continued)

FOREIGN PATENT DOCUMENTS

DE     38 83 465 T2    12/1993
DE     197 12 147 A1    3/1998
(Continued)

OTHER PUBLICATIONS

International Search Report corresponding to PCT Application No. PCT/EP2018/070553, dated Dec. 5, 2018 (German and English language document) (6 pages).

*Primary Examiner* — Thomas E Lazo
(74) *Attorney, Agent, or Firm* — Maginot, Moore & Beck LLP

(57) ABSTRACT

In a pump arrangement for a hydraulic unit of a vehicle brake system having a pump housing and a pump piston which is guided so as to be displaceable axially back and forth in the pump housing, a damping element is provided radially between the pump piston and the pump housing. The damping element damps vibrations of the pump piston which occur during an operation of the pump arrangement.

12 Claims, 5 Drawing Sheets

(51) Int. Cl.
  *B60T 13/16* (2006.01)
  *F04B 53/14* (2006.01)
  *F04B 53/16* (2006.01)

(56) References Cited

U.S. PATENT DOCUMENTS

| | | | |
|---|---|---|---|
| 6,389,955 B1* | 5/2002 | Schaefer | B60T 8/4031 |
| | | | 277/514 |
| 7,779,748 B2* | 8/2010 | Alaze | F04B 1/0421 |
| | | | 92/129 |
| 9,759,204 B2* | 9/2017 | Braun | F04B 1/0408 |
| 2010/0266427 A1* | 10/2010 | Haecker | F04B 1/0408 |
| | | | 417/273 |
| 2012/0042776 A1* | 2/2012 | Gaertner | F04B 1/0408 |
| | | | 92/172 |

FOREIGN PATENT DOCUMENTS

| | | | | |
|---|---|---|---|---|
| DE | 10 2007 052 664 A1 | 5/2009 | | |
| DE | 10 2008 002 400 A1 | 12/2009 | | |
| DE | 102008002400 A1 * | 12/2009 | | F04B 53/02 |
| DE | 10 2013 226 400 A1 | 6/2015 | | |

\* cited by examiner

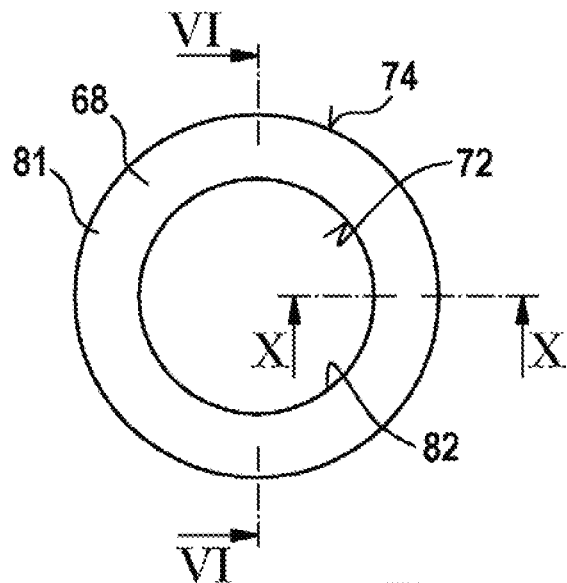
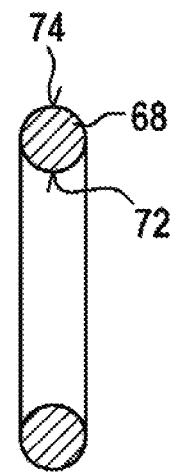
Fig. 5            Fig. 6
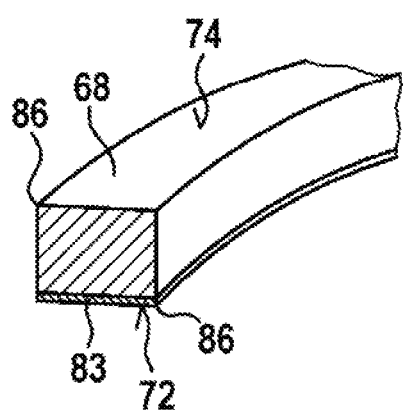
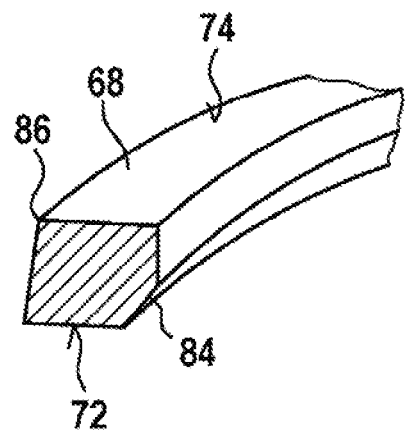
Fig. 7            Fig. 8 ained in their entirety.
PUMP ARRANGEMENT FOR A HYDRAULIC UNIT HAVING A PUMP PISTON This application is a 35 U.S.C. § 371 National Stage Application of PCT/EP2018/070553, filed on Jul. 30, 2018, which claims the benefit of priority to Serial No. DE 10 2017 216 002.0, filed on Sep. 12, 2017 in Germany, the disclosures of which are incorporated herein by reference in their entirety.

The disclosure relates to a pump arrangement for a hydraulic unit of a vehicle brake system with a pump housing and a pump piston guided so as to be displaceable axially to and fro in the pump housing.

BACKGROUND

Pump pistons serve in the pump arrangement of a hydraulic unit to suck hydraulic fluid into an associated pump housing and pump it from there under pressure into a hydraulic circuit. A regulated brake pressure can thus be provided in brake circuits in hydraulic units of vehicle brake systems such as in particular in the case of ABS/ESP hydraulic units. A radial piston pump is usually provided for this purpose, in the case of which several pump elements with in each case a pump arrangement extend radially and perpendicular to an axis or an associated drive shaft or shaft.

In this case, the individual pump piston is supported on the shaft of a drive motor on an eccentric bearing of an eccentric arranged around the shaft. Supported in such a manner, the pump piston is guided by means of the eccentric so as to be axially displaceable to and fro in the pump housing and an associated pump cylinder. An intake chamber and a pressure chamber or pump interior as well as an inlet valve and an outlet valve are furthermore provided in the pump housing. The valves serve to control a hydraulic fluid flow in the case of a pumping movement of the pump piston. A guide ring, a sealing ring and a supporting ring are further arranged within the pump housing on the low pressure side radially between the pump piston and the pump housing as a sealing and guide element. Here, the guide ring serves to guide the pump piston in the pump housing, the sealing ring as a fluid seal between the pump interior and a pump exterior and the supporting ring to support the sealing ring.

SUMMARY

According to the disclosure, a pump arrangement for a hydraulic unit of a vehicle brake system with a pump housing and a pump piston guided so as to be axially displaceable to and fro in the pump housing is created. In this case, a damping element is provided radially between the pump piston and the pump housing, by means of which damping element vibrations of the pump piston which occur during operation of the pump arrangement are damped.

Vibrations which are transmitted to the pump piston or piston supported there generally even occur at the eccentric bearing during operation of the pump arrangement substantially in the case of a rotational movement of an eccentric bearing. In particular, as a result of this, vibrations or oscillations of the piston radially with respect to its piston axis are caused. The vibrations caused in this manner are damped by means of the damping element according to the disclosure such that the vibrations of the piston are minimized in terms of their frequencies and amplitudes or are even prevented. Prevented in such a manner, no vibrations can be transmitted at sealing and guide elements which engage around the piston. Otherwise such vibrations destabilize the sealing elements in terms of their sealing action and the guide elements in terms of their guiding action. A sealing and guiding situation can therefore be significantly improved by means of the damping element according to the disclosure during operation of the pump arrangement. An undesirable input of air into a hydraulic system and/or leakage of the brake fluid can be significantly reduced or prevented. A particularly reliable braking action can be provided at the hydraulic unit.

An undesirable transmission of the vibrations to a sealing ring which surrounds the piston is avoided in particular by means of the damping element according to the disclosure. Avoided in such a manner, the sealing action of the sealing ring is ensured during the entire operation of the pump arrangement. The sealing ring is preferably arranged between a pump interior to be filled with hydraulic fluid and a pump exterior. Arranged in such a manner, the sealing ring can then always act reliably to seal off fluid between the pump interior and the pump exterior during operation.

The pump exterior is in particular an eccentric chamber in which the eccentric with its eccentric bearing and its shaft is located. The piston which is to be moved translationally to and fro by means of rotational movements of the shaft is supported on the eccentric bearing perpendicular to the shaft. In this case, high-frequency vibrations occur at the eccentric bearing which are also transmitted to the piston. The piston tends to move within a guide play available to it with oscillations in the high-frequency range and associated amplitudes or deflections transversely, in particularly radially, with respect to its piston axis. These movements can be damped or restricted and even adjusted in terms of their frequency and deflection by means of the damping element. The vibrations can thus be prevented almost at the place of origin. On the other hand, the corresponding frequencies are transmitted in particular to the sealing ring, the material of which can often not follow the high-frequency deflections as a function of its temperature. Here, the piston lifts up from the sealing ring. A gap is generated between the piston and the sealing ring which reduces the fluid-sealing action of the sealing ring. Such a gap formation is reliably prevented according to the disclosure.

The damping element according to the disclosure preferably has a purely oscillation-damping function and no fluid-sealing function as is necessary in the case of a sealing ring. A functionally appropriate material for the damping element with which its oscillation-damping properties can be optimized in a targeted manner can thus always be selected. No compromise has to be made in terms of a fluid-sealing action required in the case of a sealing ring.

According to the disclosure, a sealing ring for sealing off a pressure chamber arranged in the pump housing and to be filled with hydraulic fluid is furthermore advantageously provided radially between the pump piston and the pump housing, wherein the sealing ring is arranged on the side of the damping element facing toward the pressure chamber. Arranged in such a manner, contact of the hydraulic fluid with the damping element is avoided with the sealing ring as a result of its fluid-sealing action. As already described, it is also ensured by means of the damping element according to the disclosure that the sealing ring reliably has a sealing action over the entire operation of the pump arrangement. It is thus always ensured that the damping element does not come into contact with the hydraulic fluid and the hydraulic fluid cannot have a material-damaging effect on the damping element. The damping element thus has a long service life. The damping element also does not have to have any hydraulic fluid-resistant material. The material can be configured in a low-cost and functionally appropriate manner purely in terms of its damping function.

According to the disclosure, the damping element is advantageously configured from a material which has a different degree of hardness than the material from which the sealing ring is configured. The material of the damping element preferably has a higher degree of hardness than the material of the sealing ring. The material of the damping element has a higher degree of hardness in particular when it has a higher hardness and/or strength than the material of the sealing ring. The term hardness refers to a mechanical resistance which counteracts a mechanical penetration of another body into the material. The term strength refers to a resistance which the material has against deformation or separation. Configured in such a manner, the material of the damping element has greater resistance against deformation by means of the vibrations of the piston. The material of the damping element can thus deliberately counteract the vibrations of the piston during operation and damps its vibrations, while the material of the sealing ring is not under stress. The material of the sealing ring acts reliably in a sealing manner during the entire period of operation.

Alternatively, the damping element is advantageously configured from a material which has a lower degree of hardness than the material of the sealing ring. Such a configuration can be advantageous in certain conditions. The materials of the damping element and the sealing ring preferably do not differ primarily in terms of the degree of hardness in order to be able to satisfy their function, but rather in their material itself, in particular in their elastic and/or viscoelastic properties.

The material of the damping element particularly preferably has greater elastic and/or viscoelastic properties than the material of the sealing ring. An elasticity brings about that the damping element can deform immediately and reversibly. Viscoelastic properties are partially elastic and partially viscous. As a result of the elastic properties, the damping element deforms immediately, to a limited extent and reversibly, while it deforms in a time-dependent manner, to an unrestricted extent and irreversibly as a result of the viscous properties. The vibrations of the piston can thus not only be absorbed by means of the elastic properties of the material of the damping element and output again, but rather can be absorbed by means of the viscous properties in the material itself. A particularly good damping action of the damping element on the vibrations of the piston in particular in the high-frequency range is achieved. In the case of a deformation of the material of the damping element with the greater elastic and/or viscoelastic properties in comparison with the material of the sealing ring, greater elastic counterforces correspondingly act from the damping element on the piston. The material of the sealing ring is not influenced in this regard by the vibrations of the piston.

If the material of the sealing ring preferably has a greater degree of hardness than the material of the damping element, the sealing ring can deform to a lesser extent than the damping element. The sealing ring reliably bears in a sealing manner against the piston, while the vibrations of the piston are absorbed by the damping element by means of its higher elasticity or viscoelasticity.

According to the disclosure, the damping element is furthermore advantageously configured with an elastomer. An elastomer is a polymer with good dimensional stability which can be elastically deformed. The elastomer can briefly change its shape as a result of pressure and quickly reassume its original shape after the termination of the pressure. The elastomer is cross-linked in a wide-meshed manner and is therefore flexible. Flexible in such a manner, the elastomer can absorb the vibrations of the piston particularly quickly and extensively in a vibration-damping manner. The elastomers include all types of cross-linked rubber. Preferred elastomers are natural rubber (NR), acrylonitrile butadiene rubber (NBR), styrene butadiene rubber (SBR), chloroprene rubber (CR), butadiene rubber (BR) and ethylene propylene diene rubber (EPDM). The elastomer is preferably configured with EPDM. EPDM has a particularly high elasticity with which the vibrations can be absorbed in a damping manner and with which the damping element can reassume its original shape thereafter.

The damping element is preferably configured with an elastomer which is not hydraulic fluid-resistant, in particular not brake fluid-resistant. Such a damping element is low-cost and can be oriented in a targeted manner to its vibration-damping function.

According to the disclosure, the damping element is furthermore advantageously configured with a viscoelastomer and thus has viscoelastic properties. The vibrations of the piston can be damped particularly comprehensively with the viscoelastic properties, as already described.

According to the disclosure, the damping element furthermore preferably has a piston-bearing surface for bearing against a piston outer surface of the piston and a supporting surface facing away from the piston-bearing surface for support on an inner surface in the pump housing or housing. The piston-bearing surface is smaller than the supporting surface. With such a smaller piston-bearing surface, the damping element has a smaller surface on the piston side than on the housing side. The damping element can bear in and on the housing with such a larger supporting surface in a vibration-damping manner in a stable manner and over a wide range. At the same time, friction between the piston outer surface and the piston-bearing surface of the damping element during displacement to and fro of the piston can be kept as small as possible. The piston can move largely unhindered translationally and the damping element only wears to a small extent due to friction. In a particularly simple structural manner, the inner surface is preferably directly the inner surface of the housing as a housing inner surface.

According to the disclosure, the damping element furthermore advantageously has a piston-bearing surface for bearing against a piston outer surface of the piston, wherein the piston-bearing surface is configured with a friction-reducing coating. The friction-reducing coating is a layer which has a lower coefficient of friction than the material of the damping element without friction-reducing coating. Friction between the piston outer surface and the piston-bearing surface during to and fro displacement of the piston is minimized by means of such a coating. To this end, the friction-reducing coating is preferably an anti-friction coating and/or a grease coating or lubrication. A particularly smooth and low-friction surface is created by means of the anti-friction coating. The anti-friction coating particularly preferably has a silicon and/or polytetrafluoroethylene (PTFE) basis. A coating which is particularly flexible and does not hinder the damping element in its damping action is achieved with the silicon or polysiloxane basis. A coating which has a particularly low coefficient of friction and in the case of which static friction corresponds in its magnitude to sliding friction between two bodies is created with the PTFE basis. A transition from a standstill to movement without a jolt or stick-slip effect can thus take place at the start of a movement of the piston.

According to the disclosure, the damping element furthermore advantageously has a piston-bearing surface for bearing against a piston outer surface of the piston and a supporting surface facing away from the piston-bearing surface to be supported on an inner surface in the housing, the damping element is produced with a first and a second material and the piston-bearing surface is formed with the first material and the supporting surface is formed with the second material. In this case, the first material toward the piston outer surface has a lower coefficient of friction than the second material toward the inner surface. In particular, the first material toward the piston outer surface has lower sliding friction than the second material toward the inner surface. The piston is thus almost not braked during its translational movement on its piston outer surface and the damping element is protected from wear caused by friction. At the same time, the damping element is protected at its supporting surface by means of the second material bearing against the inner surface with the higher coefficient of friction than the first material in a comparatively stable manner in and on the housing. The inner surface in the housing is preferably an inner surface, facing toward the piston, of a component arranged in the housing, such as, for example, a guide ring. In a particularly preferred structural manner, the inner surface is directly the inner surface of the housing as the housing inner surface.

The first material is preferably PTFE which is often referred to by the trade name Teflon from DuPont. PTFE is extremely low-friction and offers very good dimensional stability. No significant shear forces can thus act between the housing and the piston. Damage to the damping element by means of pressing as a result of such shear forces can be reliably avoided. An undesirable stick-slip effect is furthermore prevented with PTFE.

The second material is advantageously an elastomer. A greater sliding friction of the damping element toward the inner surface in the housing in comparison with the first material is created with the elastomer. The damping element is thus positioned in a comparatively stable manner on the housing during to and fro displacement of the piston. At the same time, the elastomer has the dimensionally stable and elastic properties described above which are particularly advantageous for the oscillation-damping function of the damping element. The elastomer damps the radial oscillations of the piston particularly reliably, while the piston can slide almost unhindered translationally past the first material of the damping element. The elastomers described above, particularly advantageously EPDM, are preferably used as elastomers. Alternatively or additionally, the second material is preferably configured with a viscoelastomer with which the advantages described above can be achieved.

The damping element preferably engages only partially around the piston. Engaged around in such a manner, friction between the damping element and the piston can be reduced in the case of correspondingly pronounced damping.

According to the disclosure, the damping element particularly advantageously has a ring shape which configures the pump piston in a circumferentially engaging manner. Configured in such a manner, the piston is engaged around its entire circumference in a stable manner by the ring shape of the damping element and a particularly uniform damping-reducing action is achieved.

A circular damping ring is formed by means of the ring shape, the cross-section of which circular damping ring is configured to be O-shaped or rectangular in a particularly simple manner in terms of production technology. The ring shape particularly preferably has a rectangular cross-section in the case of which one corner is chamfered or graduated at the piston side.

A smaller piston-bearing surface is thus achieved in comparison with the supporting surface with the above-mentioned advantages. The ring shape is advantageously configured with a rectangular cross-section which has on the housing side, alternatively or additionally, a chamfer or graduation of a corner. The damping ring can thus be fitted or supported in the pump housing in a targeted manner. The ring shape is very particularly preferably configured as a quad ring with an approximately square cross-section. In each case an indentation is provided in the material between the corners of the square. Such a quad ring is less stiff in the radial direction in comparison with the O-ring or rectangular ring and can be better deformed when absorbing vibrations of the piston. The quad ring furthermore has, thanks to its indentation, in a friction-reducing manner a smaller piston-bearing surface as a rectangular ring. The indentation can furthermore serve to absorb a lubricant for lower friction.

In the case of a configuration of the damping element with a first and a second material, wherein the first material forms the piston-bearing surface and the second material forms the supporting surface, and the first material toward the piston outer surface has a lower coefficient of friction than the second material toward the inner surface, it is preferable to configure the cross-section of the damping element so that the damping element with its first material has a trapezoidal cross-section, the longer base side of which is arranged on the piston side. There, the vibrations of the piston can be absorbed over a wide range. A larger friction surface of the piston-bearing surface can thus indeed be achieved, but does not noticeably influence the piston thanks to the low-friction first material in its translational movement.

According to the disclosure, the ring shape advantageously has at least one damping ring portion. The ring shape engages around the piston in a stable manner, while the damping action of the damping element is only performed in portions with the at least one damping ring portion. The friction toward the piston outer surface is reduced with such partial damping. To this end, at least two damping ring portions of the ring shape are preferably provided with which the damping action is distributed evenly over the ring shape. The ring shape is particularly preferably provided on its inner radius with at least one circular arc-shaped circle segment which protrudes radially inward from the damping ring as a damping ring portion. The at least one circle segment forms the piston-bearing surface on the piston side. Such a segmented circle ring has a smaller piston-bearing surface in comparison with the supporting surface which extends radially to the outside on the damping ring and is nevertheless positioned in a stable manner around the piston with the ring shape.

According to the disclosure, a guide ring for guiding the piston in the housing is furthermore preferably provided radially between the piston and the housing, wherein the damping element is implemented, in particular integrated in the guide ring. Implemented in such a manner, the damping element can be mounted jointly with the guide ring in a particularly simple manner in a tailored fashion and at the correct position in the housing. To this end, the damping element is preferably arranged, on the piston side, adjoining the piston and, on the housing side, adjoining the guide ring and received precisely in an annular stage of the guide ring. The damping element is thus positioned in a stable manner in the guide ring and can act in a directly damping manner on the piston.

The damping element is preferably implemented in the housing for simple mounting at an appropriate interface in the housing before further components of the pump element are to be added. The damping element is particularly preferably mounted in a simple manner in terms of manufacture on or around the piston and can be installed as an assembly with the piston in the housing.

BRIEF DESCRIPTION OF THE DRAWINGS

Exemplary embodiments of the solution according to the disclosure are explained in greater detail below on the basis of the enclosed schematic drawings. In the drawings:

FIG. 5 shows a plan view of a first variant of the damping element according to the disclosure, FIG. 6 shows section VI-VI according to FIG. 5, FIG. 7 shows a sectional oblique view of a second variant of the damping element according to the disclosure, FIG. 8 shows the view according to FIG. 8 of a third variant of the damping element according to the disclosure.

DETAILED DESCRIPTION

Figure 1:
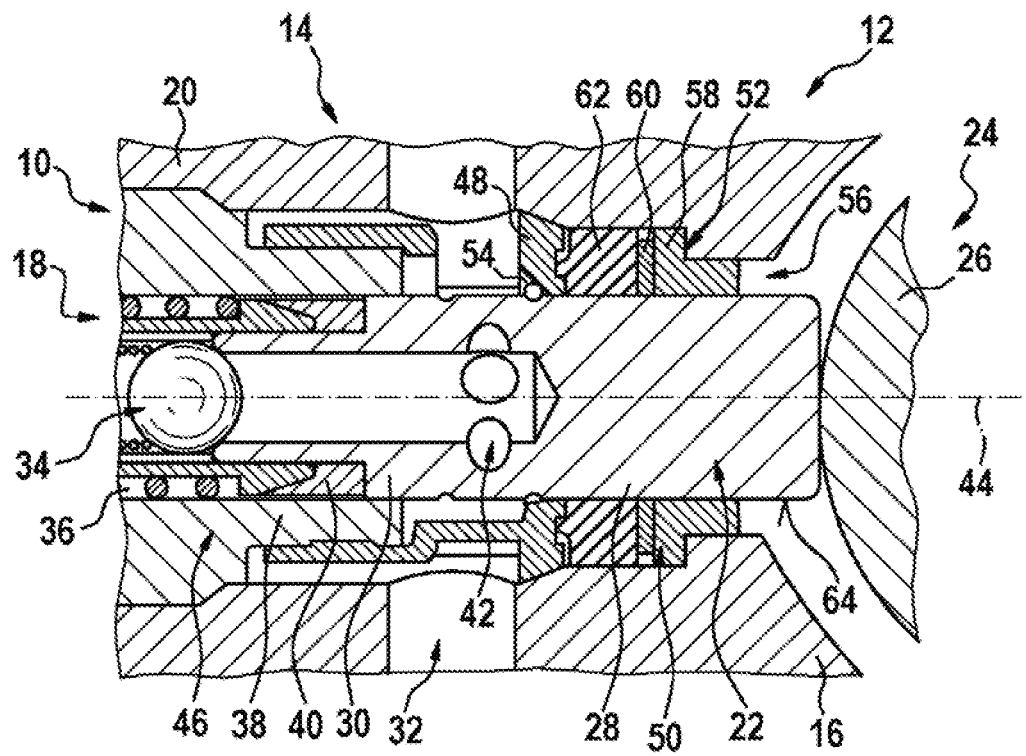
FIG. 1 shows a cross-section of a pump arrangement of a hydraulic unit according to the prior art.
Figure 2:
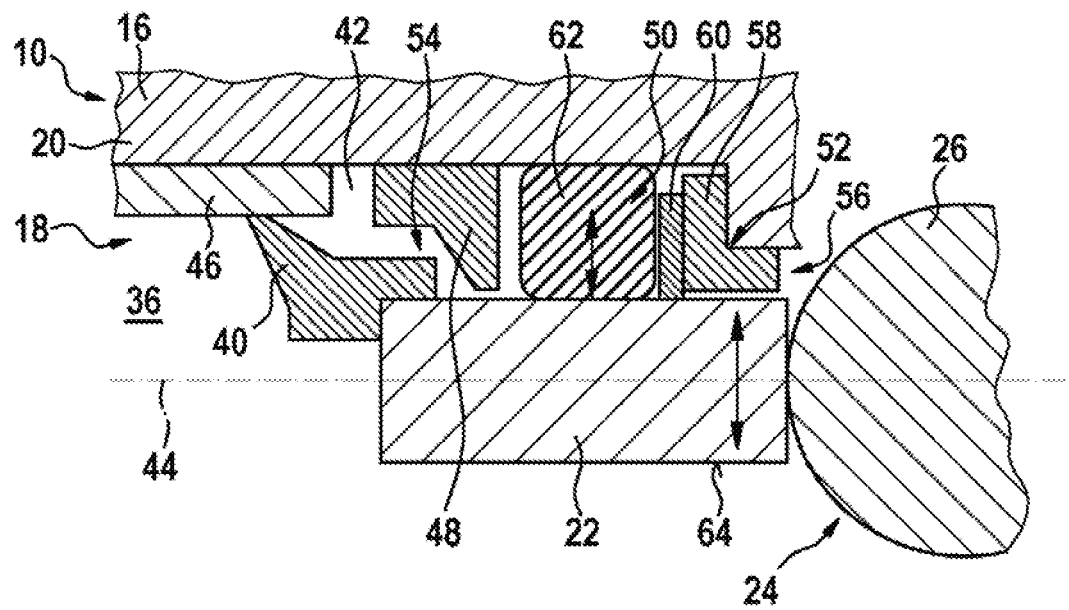
FIG. 2 shows a highly schematic representation of the view according to FIG. 1 during operation.

FIGS. 1 and 2 show a pump element 10 of an only partially represented radial piston pump 12 within an only partially formed hydraulic unit 14 of a vehicle brake system. Pump element 10 comprises a pump housing or housing 16 which is configured by means of a bore 18 in a hydraulic block 20. Pump element 10 furthermore includes a pump piston or piston 22 which is to be moved or displaced translationally to and fro by means of an eccentric 24 within housing 16. Eccentric 24 comprises, as an eccentric drive, a drive shaft, not represented, and an eccentric bearing 26 on which piston 22 is supported largely perpendicularly and radially.

In the present case, piston 22 is a multi-part pump piston. For this purpose, piston 22 comprises a piston tappet 28 supported on eccentric bearing 26 and a piston sleeve 30 adjoining piston tappet 28 with an inlet 32. A brake fluid can flow radially inward into piston sleeve 30 through inlet 32 as hydraulic fluid. An inlet valve 34 conducts the brake fluid from piston sleeve 30 into a high-pressure region 36 which is enclosed by a cylinder cup 38 which engages around piston sleeve 30. An annular piston sealing element 40 is arranged radially between cylinder cup 38 and piston sleeve 30, with which piston sealing element 40 high-pressure region 36 is sealed off from a low-pressure region 42 which belongs to piston sleeve 30 and inlet 32.

Sealed off in such a manner, piston 22 is guided along its piston axis 44 axially displaceably to and fro by means of eccentric 24 in cylinder cup 38. Cylinder cup 38 forms a part of a multi-part pump cylinder 46 which furthermore includes an annular filter 48 arranged around piston sleeve 30. Filter 48 filters the brake fluid which flows in through inlet 32.

At the same time, filter 48 supports a seal arrangement 50 axially with respect to a housing stage 52 of housing 16. Seal arrangement 50 furthermore bears in a sealing manner radially on the outside against housing 16 and radially on the inside against piston 22. Seal arrangement 50 thus separates a pump interior or pressure chamber 54 to be sealed off from a pump exterior 56. Ambient pressure prevails in pump exterior 56, while a pump pressure is generated in pressure chamber 54 in the case of operation of pump element 10. Pressure chamber 54 is filled with brake fluid through inlet 32 in the case of an extension of piston 22 out of housing 16.

Seal arrangement 50 comprises a guide ring 58, a supporting ring 60 and a sealing ring 62. Guide ring 58 is located on that side of seal arrangement 50 which faces toward pump exterior 56, is supported radially on the outside on housing 16 and bears radially on the inside against a cylindrical piston outer surface 64 of piston 22. Piston 22 is thus guided in a targeted manner during its movement and supported transverse to piston axis 44. Supporting ring 60 is furthermore arranged axially between guide ring 58 and sealing ring 62 and serves to support sealing ring 62. Sealing ring 62 is located on that side of seal arrangement 50 which faces toward pressure chamber 54 and forms the actual fluid seal between pressure chamber 54 to be filled with hydraulic fluid and pump exterior 56. Sealing ring 62 is configured for this purpose with a brake fluid-resistant material.

FIG. 2 illustrates how vibrations arise at piston 22 during operation of pump element 10. The high-frequency vibrations which occur there are transmitted to piston 22 from eccentric bearing 26 which rotates eccentrically during operation. In particular, the amplitudes associated with the vibrations extend radially to piston axis 44, as represented with the double arrow on piston 22 according to FIG. 2. Proceeding from piston 22, the vibrations are passed on to sealing ring 62. There, the vibrations cause, however, problems such that sealing ring 62 cannot follow the high-frequency vibrations with its material and piston 22 lifts off from sealing ring 62. When lifting off, a gap arises between sealing ring 62 and piston 22. Sealing ring 62 can no longer reliably seal off pressure chamber 54 from pump exterior 56.

Figure 3:
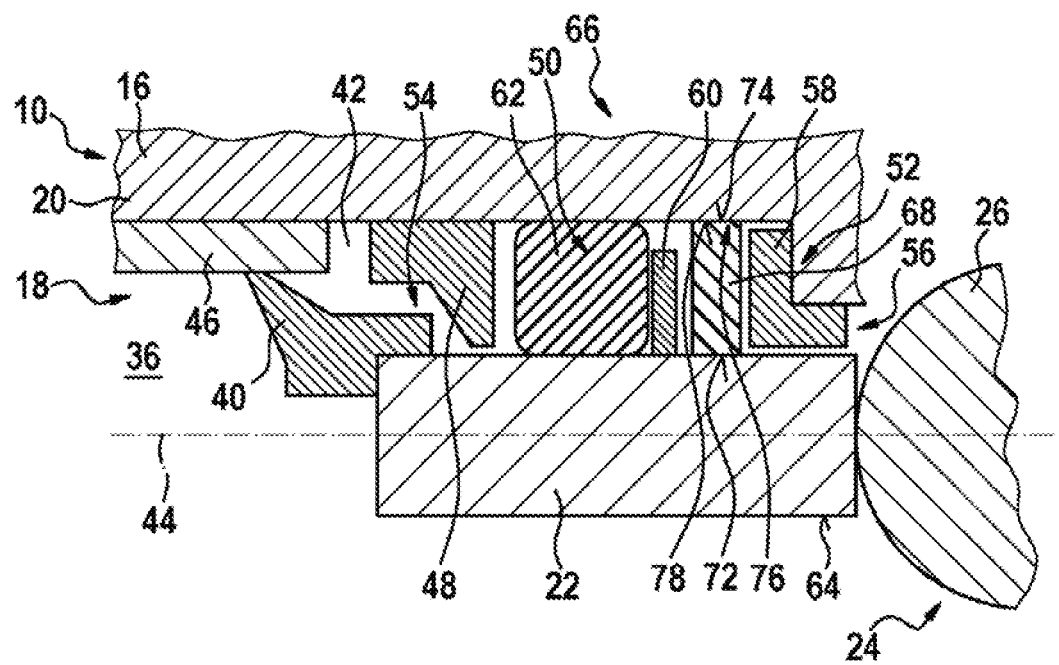
FIG. 3 shows the view according to FIG. 2 of a first exemplary embodiment of a pump arrangement according to the disclosure.
Figure 4:
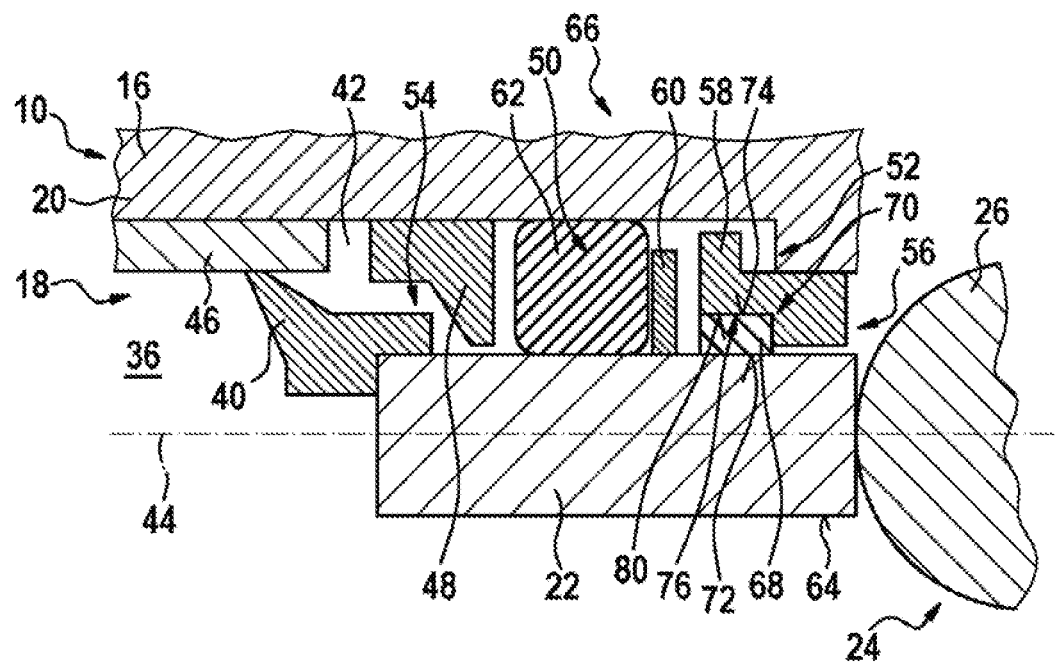
FIG. 4 shows the view according to FIG. 2 of a second exemplary embodiment of a pump arrangement according to the disclosure.
Figure 9:
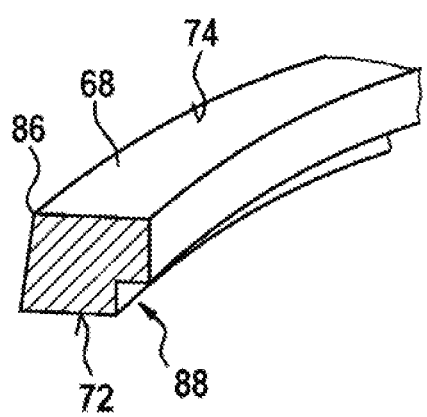
FIG. 9 shows the view according to FIG. 8 of a fourth variant of the damping element according to the disclosure.

FIGS. 3 and 4 show a pump arrangement 66 according to the disclosure in the case of which, in contrast to FIGS. 1 to 2, a damping element 68 arranged radially between piston 22 and housing 16 is provided. Damping element 68 is adapted so that it damps the vibrations which occur at piston 22 in terms of their frequency and amplitude during operation of pump element 10 and thus during operation of pump arrangement 66.

To this end, damping element 68 is arranged axially between supporting ring 60 and guide ring 58, while sealing ring 62 is arranged on that side of supporting ring 60 which faces toward pressure chamber 54. Sealing ring 62 is thus located on that side of damping element 68 which faces toward pressure chamber 54 and seals off pressure chamber 54 with its brake fluid located therein from damping element 68. Damping element 68 can thus not come into contact with the brake fluid and can be configured with a material which is not resistant to brake fluid. The material of damping element 68 is in the present case ethylene propylene diene rubber (EPDM) and has a higher degree of hardness than the material of sealing ring 62. By means of its oscillation-damping properties, damping element 68 prevents a gap formation between piston outer surface 64 or housing 16 and sealing ring 62. Sealing ring 62 can thus act in a reliably sealing manner over the entire operation of pump arrangement 66.

In the case of the exemplary embodiment according to FIG. 3, damping element 68 has been mounted, engaging annularly around piston 22, as an assembly with piston 22 into housing 16 to its appropriate interface. In the case of the exemplary embodiment according to FIG. 4, damping element 68 is implemented in an annular step 70 directly in guide ring 58. Damping element 68 and guide ring 58 form an assembly which is to be fitted into housing 16 in such a manner that damping element 68 faces toward pressure chamber 54. Such mounting is simple and can be performed in a targeted manner.

In the mounted state, damping element 68 has a piston-bearing surface 72 which bears against piston outer surface 64 of piston 22. Damping element 68 furthermore has a supporting surface 74 which bears against an inner surface 76 in housing 16 and on which damping element 68 is supported on housing 16. According to FIG. 3, inner surface 76 is a housing inner surface 78 of housing 16 itself. In the case of the exemplary embodiment according to FIG. 4, inner surface 76 is a ring inner part surface 80 of guide ring 58 which engages circumferentially around damping element 68.

Figure 10:
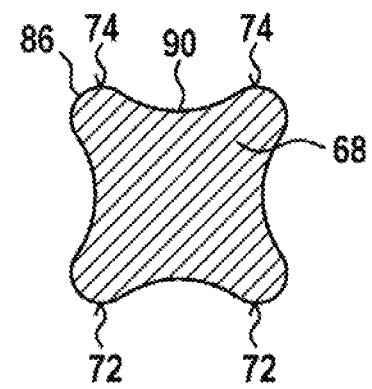
FIG. 10 shows section X-X according to FIG. 5 of a fifth variant of the damping element according to the disclosure.

FIGS. 5 to 12 show several variants of a damping element 68 which is configured with a ring shape 81 and engages around the full circumference of piston 22. Piston-bearing surface 72 extends over an entire inner circumference 82 of ring shape 81. In the case of the variant according to FIG. 6, damping element 68 is configured as an O-ring with a cross-section which has a circular form in the unloaded state. In the case of the variants according to FIGS. 7 to 9, a damping element 68 with a rectangular cross-section is provided. FIG. 7 shows a variant in the case of which a friction-reducing coating 83 is attached on the piston side to piston-bearing surface 72, which coating 83 is configured in the present case with polytetrafluoroethylene (PTFE). Such a coating 83 is where necessary possible in the case of all variants even if it is not represented explicitly. FIG. 8 shows a variant in the case of which a piston-bearing surface 72 is formed by means of a chamfer 84 of a corner 86 of the rectangular form of damping element 68, which piston-bearing surface 72 is smaller than supporting surface 74 which faces away from piston-bearing surface 72. For the same purpose, in the case of the variant according to FIG. 9, corner 86 is configured in a graduated manner by means of a graduation or groove 88. FIG. 10 shows a variant in the case of which damping element 68 is configured as a quad ring and has an approximately cuboid cross-section with four corners 86. An indentation 90 is provided between each corner 86, with which indentation 90 piston-bearing surface 72 is reduced in comparison with a damping element 68 without indentation 90.

Damping element 68 according to FIGS. 5 to 10 is produced with EPDM from a single elastomer material. In the case of the variants according to FIGS. 11 and 12, damping element 68 has a first material 92 and a second material 94. Second material 94 is configured with EPDM as elastomer and first material 92 is configured with PTFE as particularly low-friction material. Piston-bearing surface 72 is formed with first material 92 and supporting surface 74 is formed with second material 94. Configured in such a manner, first material 92 has a lower coefficient of friction toward piston outer surface 64 than second material 94 toward inner surface 76 in housing 16.

Figure 11:
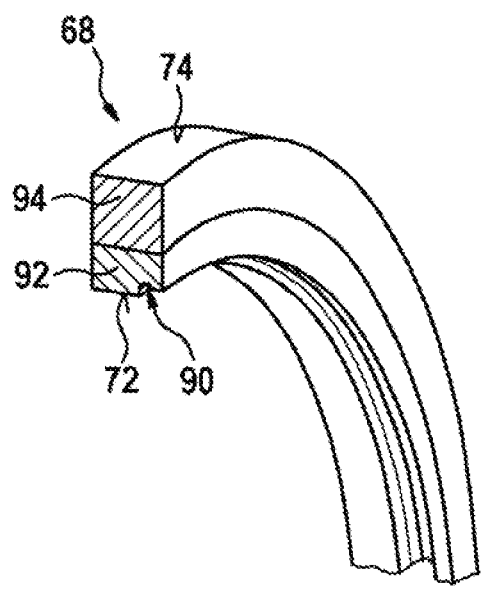
FIG. 11 shows a sectional oblique view of a sixth variant of the damping element according to the disclosure.

Damping element 68 according to FIG. 11 furthermore has a piston-bearing surface 72 configured with low-friction first material 92, which surface has an additionally friction-reducing indentation 90 on the piston side. Piston-bearing surface 72 is thus configured, in addition to the low-friction material, in a friction-reducing manner to be smaller than supporting surface 74.

Figure 12:
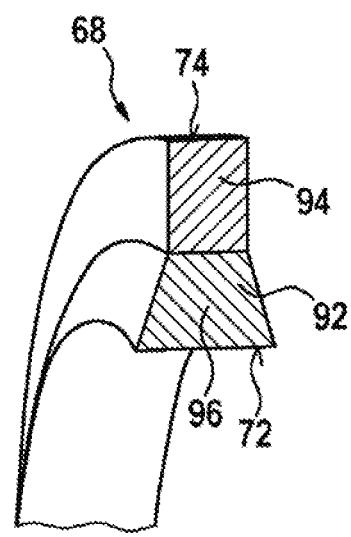
FIG. 12 shows a sectional oblique view of a seventh variant of the damping element according to the disclosure.

In the case of the variant according to FIG. 12, a material portion 96 which is configured with low-friction material 92 and is trapezoidal in cross-section of damping element 68 is created which forms with its longer base side piston-bearing surface 72. Piston-bearing surface 72 is thus indeed larger than supporting surface 74, but a loss of friction can be successfully balanced out by means of low-friction material 92. The vibrations of piston 22 can additionally be absorbed over a wider range of larger piston-bearing surface 72 into damping element 68.

Figure 13:
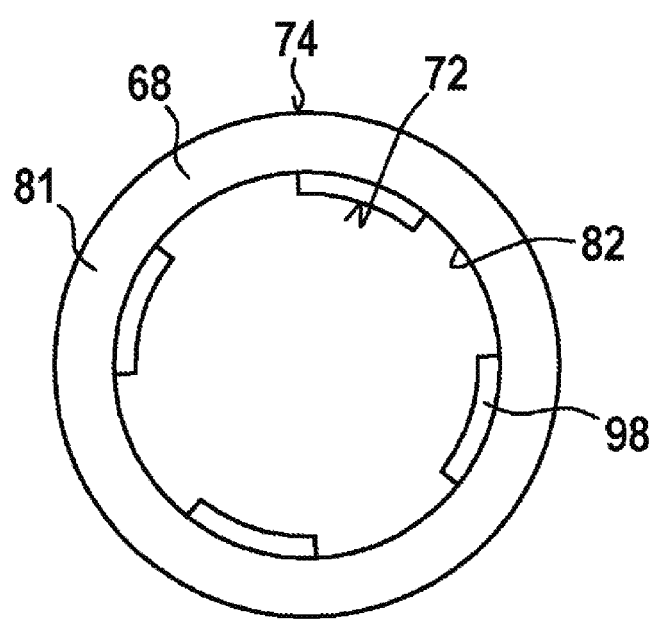
FIG. 13 shows a plan view of an eighth variant of the damping element according to the disclosure.

A variant of ring shape 81 is represented in FIG. 13, piston-bearing surface 72 of which extends in a segmented manner or in portions over inner circumference 82. For this purpose, several circular ring segments which are directed radially inward are provided as damping ring portions 98 on inner circumference 82, with which piston-bearing surface 72 is formed jointly radially on the inside. In the present case, four such ring portions 98 are preferably arranged distributed equally on inner circumference 82. Here, each individual ring portion 98 can be configured with a cross-section, as already described.

The invention claimed is:

1. A pump arrangement for a hydraulic unit of a vehicle brake system, comprising:
   a pump housing;
   a pump piston guided so as to be displaceable axially in the pump housing; and
   a damping element arranged radially between the pump piston and the pump housing, the damping element configured to damp vibrations of the pump piston which occur during operation of the pump arrangement,
   wherein the damping element comprises a piston-bearing surface that bears against a piston outer surface of the pump piston, and the piston-bearing surface is configured with a friction-reducing coating.

2. The pump arrangement as claimed in claim 1, further comprising:
   a pressure chamber defined in the pump housing and configured to be filled with hydraulic fluid; and
   a sealing ring configured to seal off the pressure chamber, the sealing ring arranged radially between the pump piston and the pump housing on a side of the damping element facing toward the pressure chamber.

3. The pump arrangement as claimed in claim 2, wherein the damping element is formed from a first material, which has a different degree of hardness than a second material from which the sealing ring is formed.

4. The pump arrangement as claimed in claim 1, wherein the damping element is formed of an elastomer.

5. The pump arrangement as claimed in claim 4, wherein the elastomer is not hydraulic fluid-resistant.

6. The pump arrangement as claimed in claim 4, wherein the elastomer is not brake fluid-resistant.

7. The pump arrangement as claimed in claim 1, wherein the damping element comprises:

a piston-bearing surface that bears against a piston outer surface of the pump piston; and
a supporting surface facing away from the piston-bearing surface and supported on an inner surface in the pump housing,
wherein the piston-bearing surface is smaller than the supporting surface.

8. The pump arrangement as claimed in claim 1, wherein the damping element comprises:
a piston-bearing surface that bears against a piston outer surface of the pump piston; and
a supporting surface facing away from the piston-bearing surface and supported on an inner surface in the pump housing,
wherein the damping element is of a first material and a second material, the piston-bearing surface formed of the first material and the supporting surface formed of the second material, and
wherein the first material has a lower coefficient of friction than the second material.

9. The pump arrangement as claimed in claim 1, wherein the damping element has a ring shape which circumferentially engages the pump piston.

10. The pump arrangement as claimed in claim 9, wherein the ring shape has at least one damping ring portion.

11. The pump arrangement as claimed in claim 1, further comprising:
a guide ring arranged radially between the pump piston and the pump housing and configured to guide the pump piston in the pump housing, wherein the damping element is implemented in the guide ring.

12. A pump arrangement for a hydraulic unit of a vehicle brake system, comprising:
a pump housing;
a pump piston guided so as to be displaceable axially in the pump housing; and
a damping element arranged radially between the pump piston and the pump housing, the damping element configured to damp vibrations of the pump piston which occur during operation of the pump arrangement,
wherein the damping element comprises:
a piston-bearing surface that bears against a piston outer surface of the pump piston; and
a supporting surface facing away from the piston-bearing surface and supported on an inner surface in the pump housing,
wherein the damping element is of a first material and a second material, the piston-bearing surface formed of the first material and the supporting surface formed of the second material, and
wherein the first material has a lower coefficient of friction than the second material.

* * * * *